(12) United States Patent
Wang

(10) Patent No.: US 6,219,963 B1
(45) Date of Patent: Apr. 24, 2001

(54) DRIP TYPE WATERING DEVICE FOR USE IN GARDENING

(75) Inventor: Gary Wang, Ontario (CA)

(73) Assignee: Aquastar Industries, Inc., Ontario (CA)

( * ) Notice: Subject to any disclaimer, the term of this patent is extended or adjusted under 35 U.S.C. 154(b) by 0 days.

(21) Appl. No.: 09/348,579

(22) Filed: Jul. 7, 1999

(51) Int. Cl.⁷ .................................................. A01G 29/00
(52) U.S. Cl. ............................................ 47/48.5; 239/38
(58) Field of Search ...................... 47/48.5; 141/364; 222/108; 239/38, 120, 542

(56) References Cited

U.S. PATENT DOCUMENTS

| | | | |
|---|---|---|---|
| 205,665 | * 7/1878 | Miller et al. | 141/100 |
| 500,734 | * 7/1893 | Bennett | 239/38 |
| 3,406,880 | * 10/1968 | Stull | 222/521 |
| 5,259,142 | * 11/1993 | Sax | 47/48.5 |
| 6,052,942 | * 4/2000 | Chu | 47/48.5 |
| 6,128,856 | * 10/2000 | Doan | 47/48.5 |

\* cited by examiner

*Primary Examiner*—Charles T. Jordan
*Assistant Examiner*—Francis T. Palo
(74) *Attorney, Agent, or Firm*—Dougherty & Troxell

(57) ABSTRACT

A drip type watering device for gardening use is disclosed; and more particularly it relates to a watering device which is inserted partially into soil to permit water, liquid fertilizer or chemicals for change of nature of soil of plants to be discharged drop by drop automatically without periodically watering by manual labor. It is made up of a container, an adjustment cap, a sealing lid and an insertion means. The adjustment cap adjustably engaged with the sealing lid is removably secured to the container is used either to precisely regulate the volume of water to be discharged with ease or to effectively seal a container associated with the watering device to prevent water from leaking out.

4 Claims, 7 Drawing Sheets

DRIP TYPE WATERING DEVICE FOR USE IN GARDENING

BACKGROUND OF THE INVENTION

The present invention relates to a drip type watering device for gardening use and more particularly to a watering device which is inserted partially into soil so as to permit water, liquid fertilizer or chemicals for change of nature of the soil to be discharged drop by drop automatically without periodically watering by manual labor. Besides, an adjustment cap is used either to precisely regulate the volume of water to be discharged or to effectively seal a container associated with the watering device to prevent water from leaking out.

Many people like to grow some kinds of green plants indoors so as to make themselves relaxed and enjoy fresh air domestically in a busy city life. Some people even grow high valued orchids in their houses, which must be looked after with great care. However, people becoming rich are fond of travelling abroad once or twice every year in big cities all over the world, and the indoor plants are left unattended during the period when people in a house all leaving for a trip. Routine watering, fertilizing and distribution of soil varying chemicals are not performed in that case. So, they are troubled to ask for help or assistance from neighbors or friends to take care of the plants for them.

To solve such a problem, a prior art drip type watering device was designed, as shown in FIG. 1, a slopedly planted pole 1 having a hook member 2 disposed at the top end thereof is provided to hold a supporting frame 3 in which a bottle 4 is placed. Water, fertilizer or chemicals for change nature of soil is selectively housed in the bottle 4. The pole 1 having a pointed bottom end is inserted into soil of a planting ground and a supporting post 5 is placed next to the inserted pole 1 to prevent the pole 1 from collapsing when the load of the bottle 4 is added thereto. A flexible delivery tube 6 having an adjusting means 7 placed at the middle thereof for regulation of volume of the water in the bottle is engaged with a cork sealed opening of the bottle 4. A vent hole 8 with a vent tube 9 inserted therein is also disposed in the opening. Thereby, water in the bottle 4 can be discharged into the soil drop by drop.

Such a prior art drip type watering device has the following disadvantages:
1. The adjusting means 7 can not effectively stop water to be dripped from the bottle 4 completely by way of the delivery tube 6 when the adjusting means 7 is totally sealed.
2. The adjustment wheel of the adjusting means 7 can not precisely regulate water volume in practical use.
3. The components of the prior art are relatively too many to produce at a low cost and it is tedious to put them together.

SUMMARY OF THE INVENTION

Therefore, the primary object of the present invention is to provide an improved drip type watering device which has an adjustment cap regulating volume of discharged water. To totally stop water from dripping from the bottle, a person only has to screw the adjustment cap upwardly tight so as to effectively prevent both water and air from leakage.

Another object of the present invention is to provide an improved drip type watering device having an adjustment cap which can precisely regulate water volume.

One further object of the present invention is to provide an improved drip type watering device which has less components and is easier in assembly so as to lower the production cost and facilitate installation in practical use.

DETAILED DESCRIPTION OF THE PREFERRED EMBODIMENT

Figure 1:
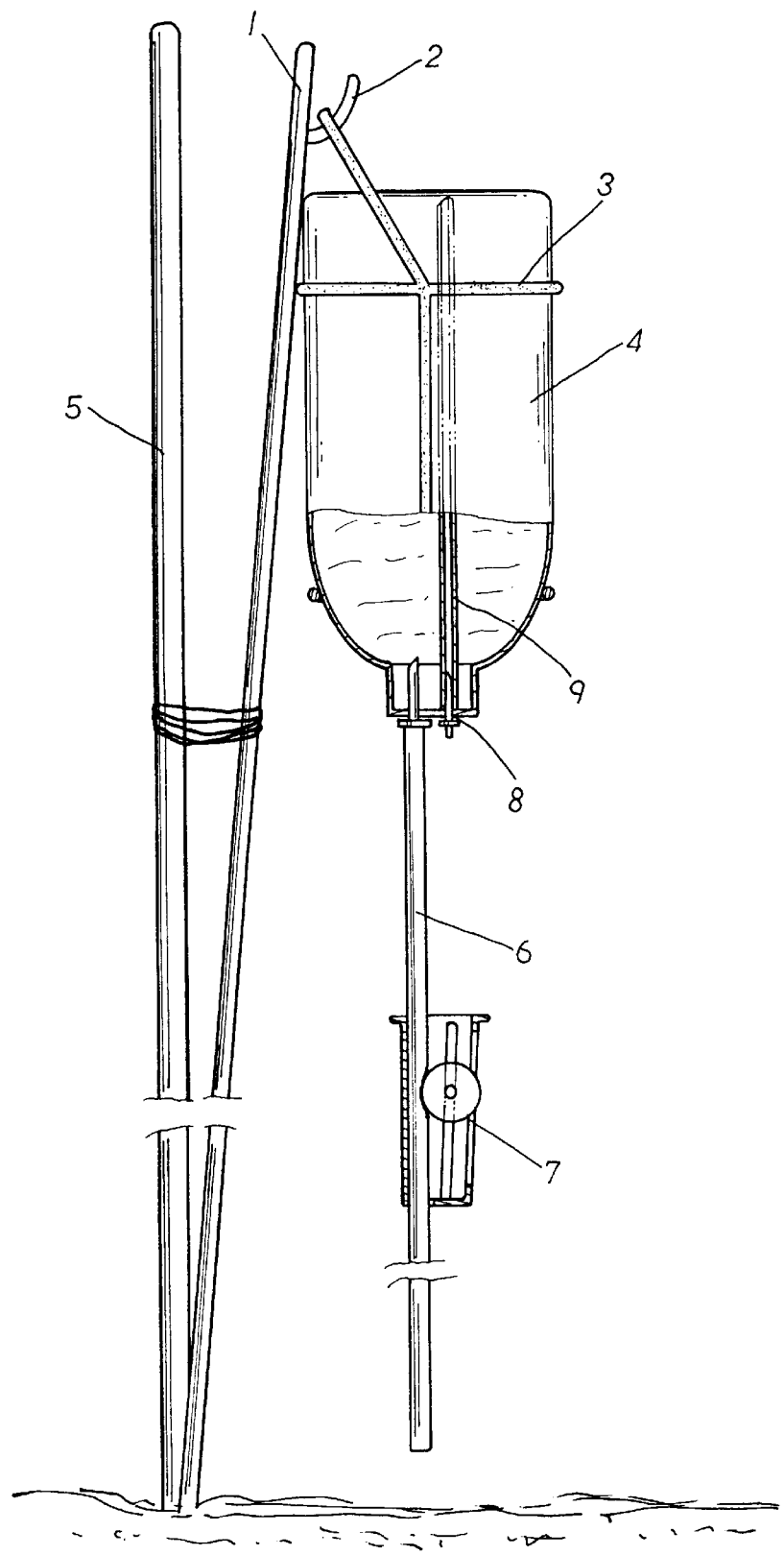
FIG. 1 is a plane diagram showing the operation of a prior art drip type watering device for use in gardening.
Figure 2:
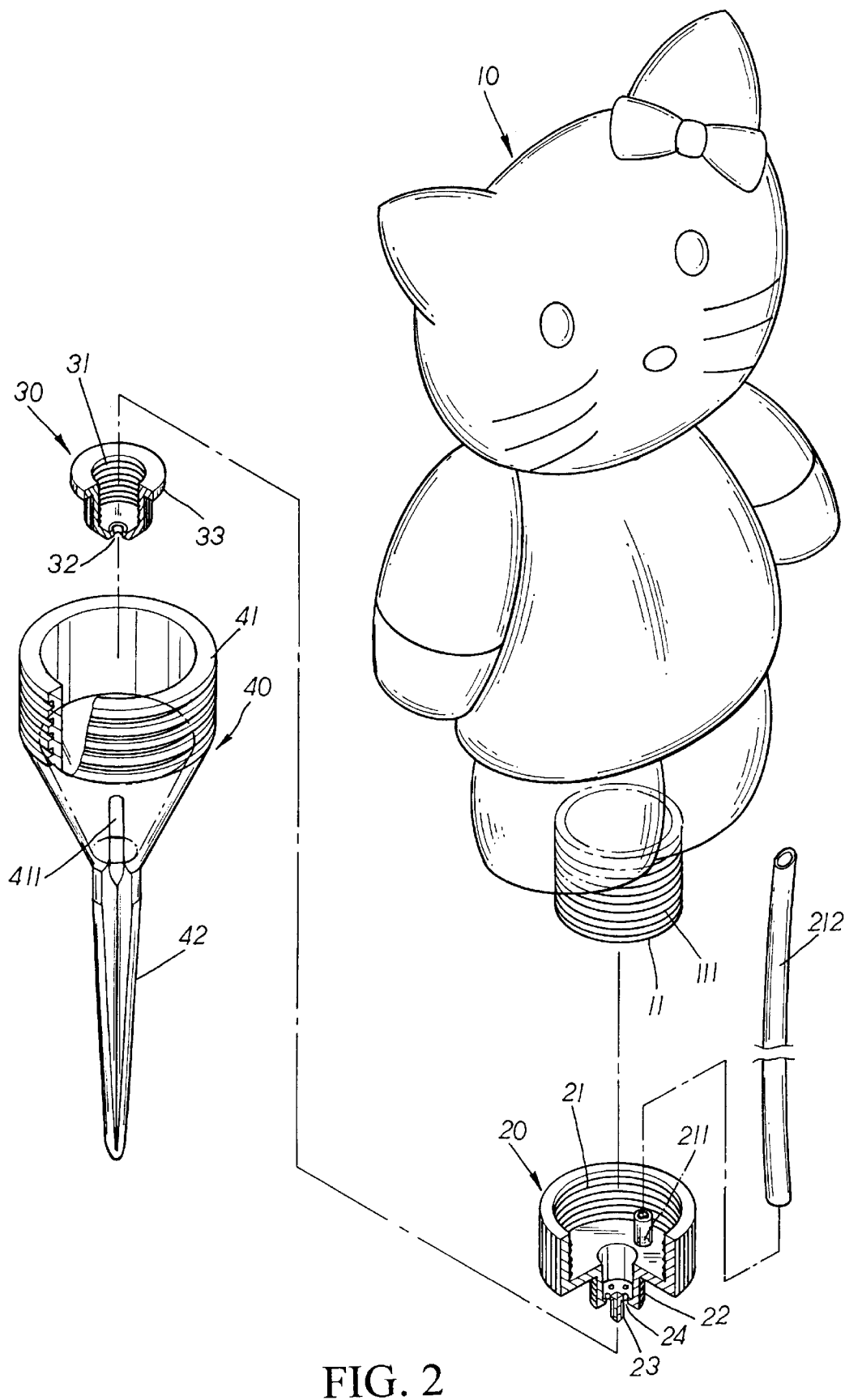
FIG. 2 is a perspective diagram showing the exploded components of the present invention.

Referring to FIG. 2, the drip type watering device of the present invention comprises a container 10, a sealing lid 20, an adjustment cap 30 and an insertion means 40.

The container 10 formed in any shape or configuration for storage of water, liquid fertilizer or chemicals for change of nature of soil has a tubular opening 11 has external threads 111 disposed thereon.

The sealing lid 20 has a two-staged structure and is hollow in the interior. It has a large diametered upper portion provided with internal threads 21 and a small diametered lower portion provided with external threads 22. The upper portion and the lower portion communicate with each other by a tubular hole which terminates with a conical downward stud 23 having four slots 24 disposed thereon. Next to the tubular hole of the upper portion is erected a vertical tubular vent post 211 and a flexible tube 212 engaged with the tubular vent post 211 permits air to be led into the container 10 to keep air pressure balanced in operation.

The adjustment cap 30 has internal threads 31 and a conically tapered bottom which is provided with a dripping hole 32 at a center of said tapered bottom. The adjustment cap 30 also has a flanged periphery 33 at the top thereof.

The insertion means 40 is a tube 41 of a funnel shape and has a conically extended insertion pole 42 having a cross-shaped sectional face and on the conically tapered surface of the insertion pole 42 of the insertion means 40 are disposed 4 spaced axially extended slots 411.

Figure 3:
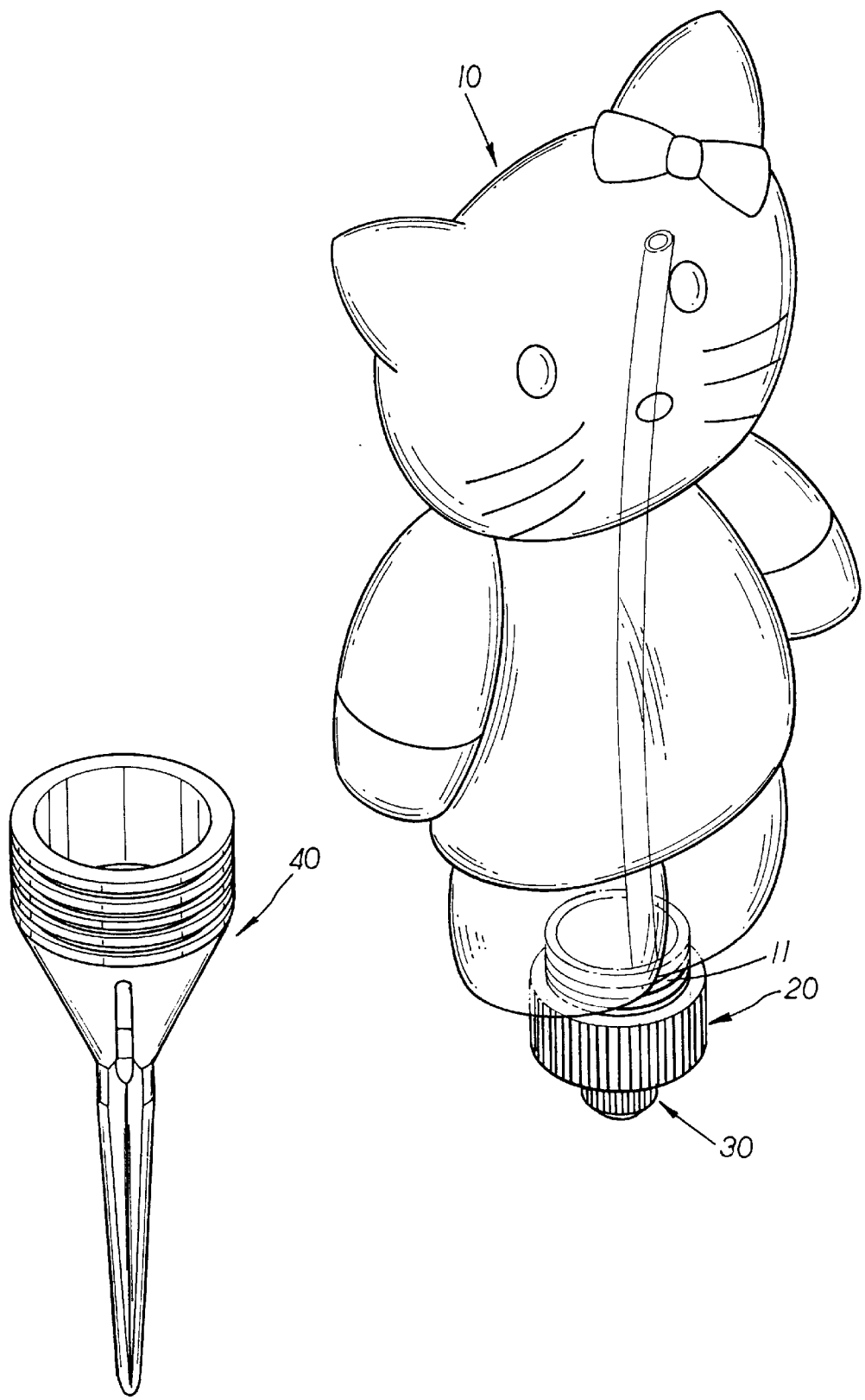
FIG. 3 is a perspective diagram showing the assembly of the drip type watering device of the present invention.

Referring to FIG. 3, to get the watering device of the present invention assembled, the sealing lid 20 is engaged with the tubular opening 11 of the container 10 by way of the internal threads 21 and the external threads 111. Then, the adjustment cap 30 is engaged with the small diametered lower portion of the sealing lid 20 by way of the internal threads 31 of the adjustment cap 30 and the outer threads 22 of the sealing lid 20.

Figure 4:
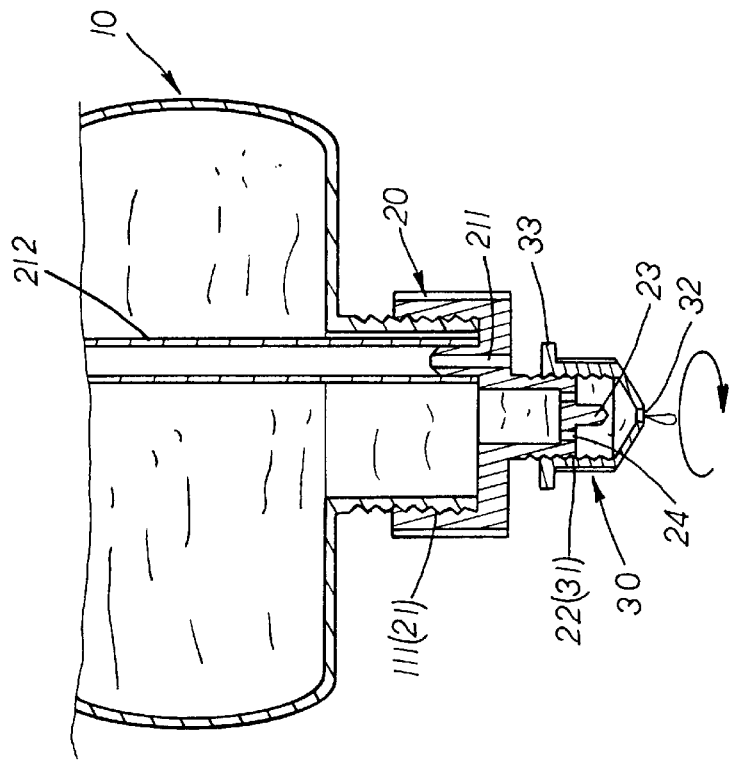
FIG. 4 is a sectional diagram showing water being discharged in a relatively large-volume manner.

To get larger volume of water dripped in a period of time, as shown in FIG. 4, the adjustment cap 30 is rotated loose downwardly in a proper manner so as to produce larger clearance between the dripping hole 32 of the adjustment cap 30 and the conic stud 23 of the sealing lid 20. Thereby water, liquid fertilizer or chemicals for change the nature of soil received in the container 10 can flow via the spaced four slots 24 of the stud 23 of the sealing lid 20 into the adjustment cap 30 and further drip out via the dripping hole 32 in a relatively large quantity.

Figure 5:
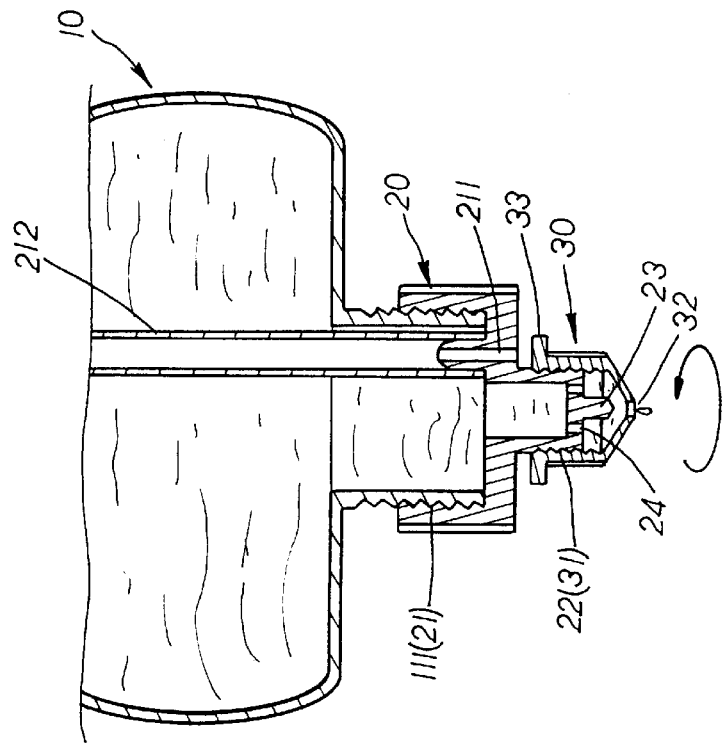
FIG. 5 is a sectional diagram showing water being discharged in a relatively small-volume manner.

To regulate the water to drip in a smaller volume, referring to FIG. 5, the adjustment cap 30 is turned tight upwardly so as to make the clearance between the conic stud 23 of the sealing lid 20 and the dripping hole 32 of the adjustment cap 30 reduced to such an extent that water, fertilizer or chemicals drip out from the dripping hole 32 in a smaller amount.

Figure 6:
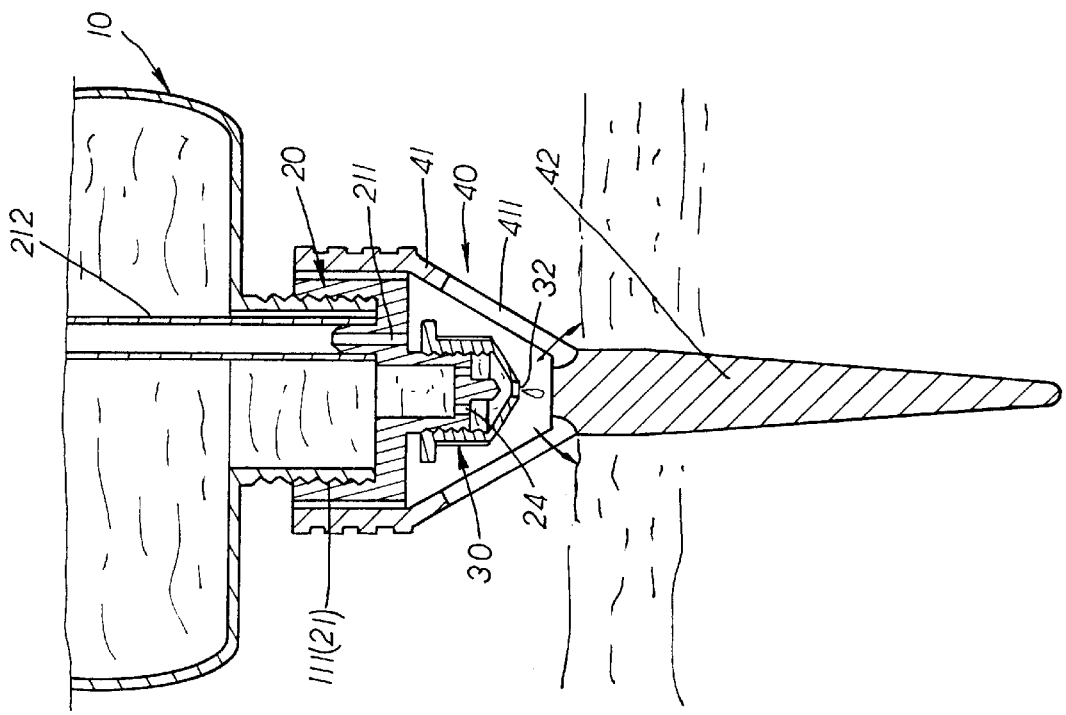
FIG. 6 is a sectional diagram showing the operational mode of the present invention.

Referring to FIG. 6, as the watering device is set in a proper mode to obtain a required water dripping extent, the insertion means 40 is planted into the soil by way of the insertion pole 42 first, then the sealing lid 20 together with the adjustment cap 30 is engaged with and housed in the funnel tube 41 of the insertion means 40. The upper portion of the sealing lid 20 is in abutment against the tapered top inner edge of the funnel tube 41 so as to permit water to be dripped out of the slots 411 of the funnel tube 41 and discharged into the soil.

Figure 7:
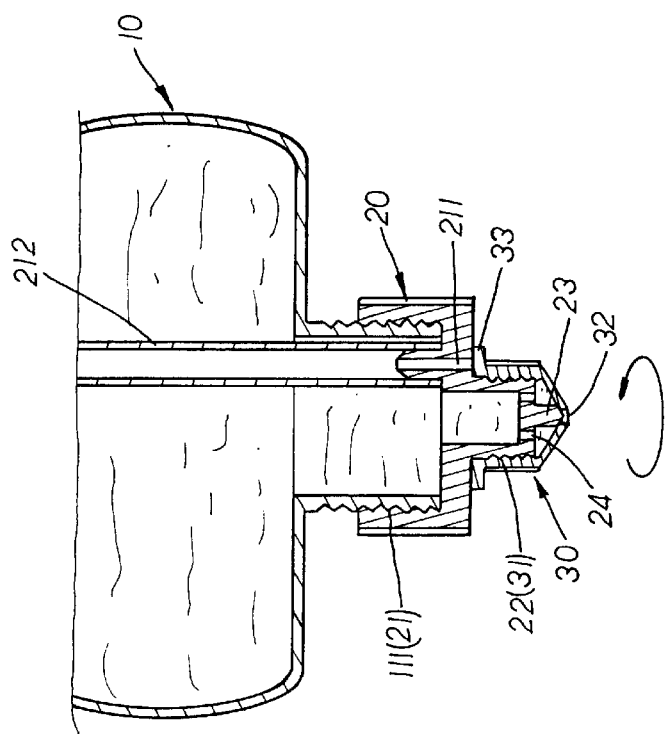
FIG. 7 is a sectional diagram showing a closed state of the present invention.

Referring to FIG. 7, to stop water, liquid fertilizer or chemicals from dripping into soil from the container 10, the sealing lid 20 and the adjustment cap 30 are taken out of the funnel tube 41 of the insertion means 40, and the adjustment cap 30 is turned tight upwardly so as to make the stud 23 in sealing engagement with the dripping hole 32 of the adjustment cap 30. In the meantime, the flanged periphery 33 of the adjustment cap 30 becomes in sealing engagement with the bottom side of the upper portion of the sealing lid 20, resulting in the sealing closure of the vent post 211 of the sealing lid 20. Thus, the container 10 is doubly sealed to prevent water from dripping out further.

Figure 8:
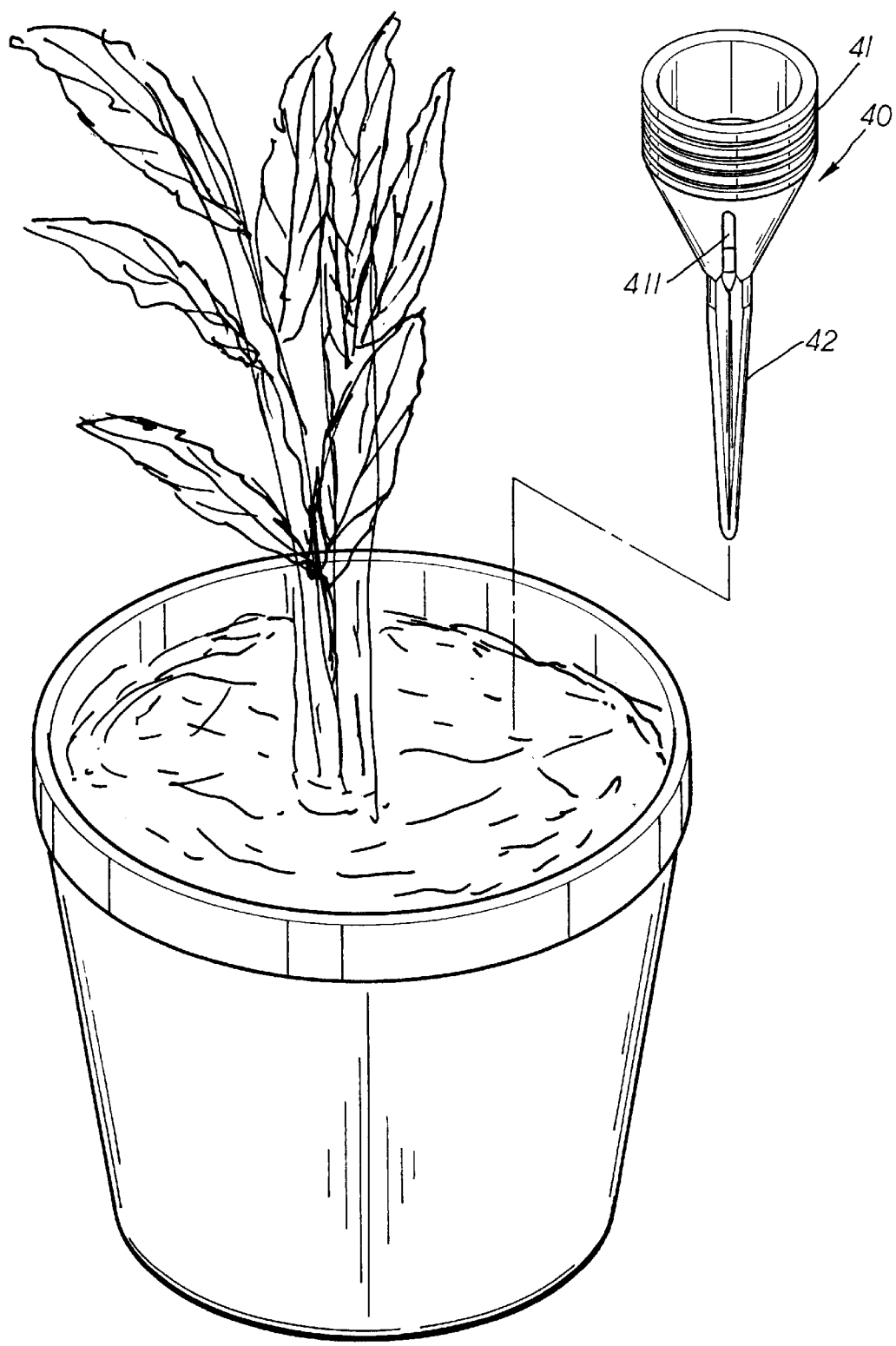
FIG. 8 is a diagram showing the application of a soil insertion means solely to a potted plant.
Figure 9:
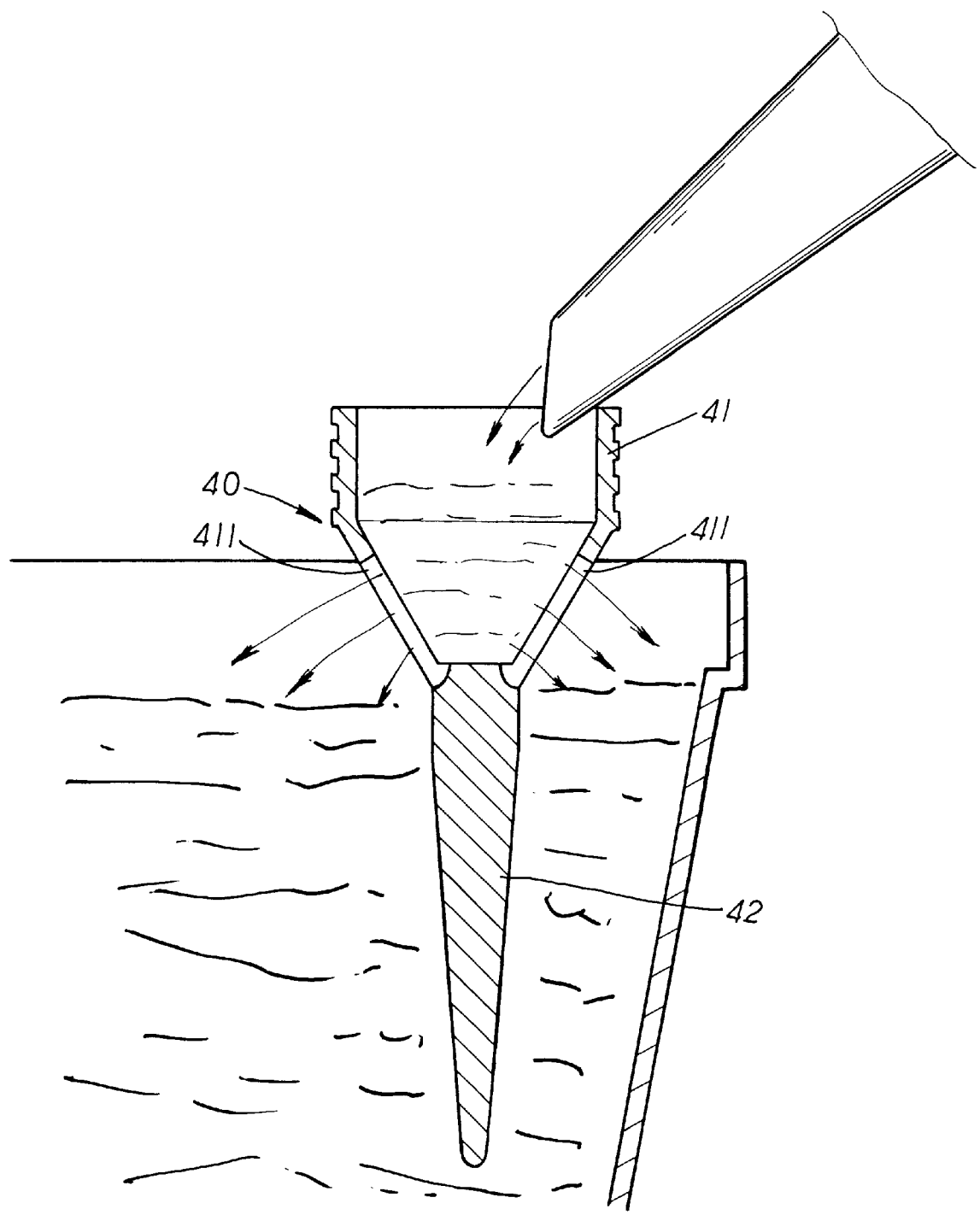
FIG. 9 is a sectional diagram showing the application of the single insertion device to soil of a potted plant.

Referring to FIG. 8, the insertion means 40 is solely used. It is inserted directly into the soil by way of the insertion pole 42 and water, liquid fertilizer or chemicals is poured into the funnel tube 41 of the insertion means 40 so as to permit the same to be discharged from the four slots 411 of the funnel tube 41, as shown in the sectional diagram of FIG. 9.

It can be clearly seen from the preceding accounts on the features of the present invention that the watering device of the present invention has the following advantages:

1. It is convenient to seal water in the container 10 completely by simply rotating tight upwardly the adjustment cap 30 so as to stop water dripping into soil in practical use.

2 The amount water dripped into soil can be precisely and simply controlled by way of variation of the clearance between the dripping hole 32 of the adjustment cap 30 and the stud 23 of the sealing lid 20.

3. The components are relatively less than conventional watering device and it is easy to assemble and produced at a lower price and in less time.

I claim:

1. A drip type watering device for use in gardening, comprising:

a container, a sealing lid, an adjustment cap and an insertion means wherein:

said container formed in any shape or configuration for storage of water, liquid fertilizer or chemicals for change of nature of soil has a tubular opening having external threads disposed thereon; a vent hole is disposed next to said tubular opening to which a flexible tube is coupled;

said sealing lid has an upper portion of a large diameter in connection to a lower portion of a small diameter; said upper portion has internal threads and said lower portion has external threads so as to permit said upper portion of said sealing lid to be removably secured to said tubular opening; said lower portion of said sealing lid terminates in a stud having a number slots for discharging water therethrough;

said adjustment cap has internal threads and a conically tapered bottom which is provided with a dripping hole at a center of said tapered bottom and has a flanged periphery at a top edge thereof which can be in sealing engagement with said vent hole so as to stop air flowing into said container when dripping of water from said container is stopped;

said insertion means of a funnel shape has a downward insertion pole and on a conically tapered surface of said insertion means are disposed a plurality of spaced axially extended slots;

said insertion means has a downwardly tapered insertion pole having a plurality of axially extended slots disposed thereon in connection to a funnel shaped tube in which said integrated sealing lid and adjustment cap are housed;

whereby said adjustment cap is engaged with said lower portion of said sealing lid, which is secured to said threaded bottom opening of said container, by way of said internal threads of said adjustment cap and said external threads of said sealing lid and said insertion means pierces into soil with its insertion pole; said adjustment cap is rotated upwardly or downwardly with respect to said sealing lid so as to vary the amount of water, liquid fertilizer or chemicals flowing through a space defined between said slots of said stud of said sealing lid and said conical bottom of said adjustment cap, resulting in precise and simple regulation of water dripped from said container.

2. The drip type watering device as claimed in claim 1 wherein said stud of said sealing lid is of a conically tapered form.

3. The drip type watering device as claimed in claim 1 wherein said adjustment cap has a top flanged periphery which is in sealing engagement with said vent hole of said sealing lid when said adjustment cap is rotated upwardly for stopping water from dripping out of said container.

4. The drip type watering device as claimed in claim 1 wherein said insertion pole has a cross shaped sectional face with a tapered pointed bottom end.

* * * * *